US012115583B2

(12) United States Patent
Bowden, Jr. et al.

(10) Patent No.: US 12,115,583 B2
(45) Date of Patent: Oct. 15, 2024

(54) SYSTEMS AND METHODS FOR ADHESIVE-BASED PART RETENTION FEATURES IN ADDITIVELY MANUFACTURED STRUCTURES

(71) Applicant: DIVERGENT TECHNOLOGIES, INC., Los Angeles, CA (US)

(72) Inventors: Thomas Samuel Bowden, Jr., Los Angeles, CA (US); Chukwubuikem Marcel Okoli, Los Angeles, CA (US); Richard Winston Hoyle, Clarkston, MI (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 370 days.

(21) Appl. No.: 16/184,801

(22) Filed: Nov. 8, 2018

(65) Prior Publication Data
US 2020/0147684 A1 May 14, 2020

(51) Int. Cl.
*B22F 12/88* (2021.01)
*B22F 10/18* (2021.01)
(Continued)

(52) U.S. Cl.
CPC .............. *B22F 12/88* (2021.01); *B33Y 10/00* (2014.12); *B33Y 30/00* (2014.12); *B33Y 80/00* (2014.12); *B22F 10/18* (2021.01); *B22F 10/28* (2021.01)

(58) Field of Classification Search
CPC .......... B22F 10/10; B22F 10/20; B22F 7/062; B22F 10/00; B33Y 30/00; B33Y 80/00;
(Continued)

(56) References Cited

U.S. PATENT DOCUMENTS 3,960,637 A    6/1976   Ostrow
4,109,944 A *   8/1978   Curtin .................... F16L 47/26
                                                                    285/133.11

(Continued)

FOREIGN PATENT DOCUMENTS

CN       107009614 A     8/2017
EP        3385076 A1    10/2018
(Continued)

OTHER PUBLICATIONS

US 9,202,136 B2, 12/2015, Schmidt et al. (withdrawn)
(Continued)

*Primary Examiner* — Michael N Orlando
*Assistant Examiner* — Abhishek A Patwardhan
(74) *Attorney, Agent, or Firm* — ARENTFOX SCHIFF LLP

(57) ABSTRACT

Systems and methods for adhesive-based part retention features in additively manufactured structures are disclosed. A structure includes a first AM part configured to connect to a second part via a primary connection applied to an interface between the first AM part and the second part. The structure includes at least one retention element including a secondary connection. The secondary connection includes a first adhesive configured to secure the first AM part and the second part. The secondary connection may be located to provide a connection between the first AM part and the second part.

10 Claims, 10 Drawing Sheets

(51) Int. Cl.
  *B22F 10/28* (2021.01)
  *B33Y 10/00* (2015.01)
  *B33Y 30/00* (2015.01)
  *B33Y 80/00* (2015.01)

(58) Field of Classification Search
  CPC ......... B33Y 10/00; B33Y 40/00; Y02P 10/25;
      B29C 64/153; B29C 64/268; B29C
      64/205; B29C 64/379; B29C 65/18; B29C
      65/48; B29C 65/52; B29C 65/72; B29C
      65/7802; F16B 11/006
  USPC .................. 156/242; 162/134; 427/207.1
  See application file for complete search history.

(56) References Cited

U.S. PATENT DOCUMENTS

| | | | |
|---|---|---|---|
| 4,250,596 A * | 2/1981 | Hara | B29C 66/126 |
| | | | 52/309.3 |
| 5,203,226 A | 4/1993 | Hongou et al. | |
| 5,742,385 A | 4/1998 | Champa | |
| 5,854,431 A | 12/1998 | Linker et al. | |
| 5,990,444 A | 11/1999 | Costin | |
| 6,010,155 A | 1/2000 | Rinehart | |
| 6,021,753 A | 2/2000 | Chaffin et al. | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,540,855 B1 | 4/2003 | Holmberg | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,849,150 B1 | 2/2005 | Schmidt | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Ane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |

(56) References Cited

U.S. PATENT DOCUMENTS

| | | |
|---|---|---|
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Evin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |

(56) References Cited

U.S. PATENT DOCUMENTS

| | | | |
|---|---|---|---|
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2002/0015615 A1 | 2/2002 | Hanlon |
| 2006/0108783 A1 | 5/2006 | Ni et al. |
| 2006/0243382 A1 | 11/2006 | Kilwin et al. |
| 2007/0114227 A1 | 5/2007 | Stumpf et al. |
| 2007/0261787 A1 | 11/2007 | Malis |
| 2009/0279829 A1 | 11/2009 | Popp et al. |
| 2010/0142359 A1 | 6/2010 | Sakata et al. |
| 2014/0212637 A1* | 7/2014 | Syvret ................. B32B 7/12 |
| | | 156/60 |
| 2014/0241790 A1 | 8/2014 | Woleader et al. |
| 2014/0277669 A1 | 9/2014 | Nardi et al. |
| 2015/0145386 A1 | 5/2015 | Chang |
| 2015/0230600 A1 | 8/2015 | Schulte |
| 2015/0289606 A1 | 10/2015 | Coakley et al. |
| 2016/0061381 A1* | 3/2016 | Kotliar ................. F17C 13/04 |
| | | 219/76.12 |
| 2016/0250807 A1 | 9/2016 | Atwood |
| 2017/0113344 A1 | 4/2017 | Schönberg |
| 2017/0341309 A1 | 11/2017 | Piepenbrock et al. |
| 2018/0022019 A1* | 1/2018 | Levine ................. B33Y 10/00 |
| | | 425/375 |
| 2018/0111329 A1* | 4/2018 | Tanaka ............... B29C 66/1282 |
| 2018/0290423 A1* | 10/2018 | Twelves, Jr. ............. B32B 7/12 |
| 2018/0363691 A1 | 12/2018 | Gunner et al. |
| 2019/0048912 A1 | 2/2019 | Czinger et al. |
| 2019/0146456 A1 | 5/2019 | Czinger et al. |
| 2020/0147684 A1 | 5/2020 | Bowden, Jr. et al. |
| 2021/0154950 A1 | 5/2021 | Czinger |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2018077366 A1 | 5/2018 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |
| WO | 2019166778 A1 | 9/2019 |

OTHER PUBLICATIONS

US 9,809,265 B2, 11/2017, Kinjo (withdrawn)
US 10,449,880 B2, 10/2019, Mizobata et al. (withdrawn)
Richardot, Sculpteo—'How to connect to parts with 3D printed joints and snap fits', 2018 (Year: 2018).*
International Search Report & Written Opinion received in PCT/US2019/060400 mailed Jan. 13, 2020.
Bone, G. and Capson D., "Vision-Guided fixtureless Assembly of Automotive Components", Robotics and Computer Integrated Manufacturing, vol. 19, pp. 79-87, 2003. DOI: 10.1016/S0736-5845(02)00064-9.
James K. Mills et al., "Robotic Fixtureless Assembly of Sheet Metal Parts Using Dynamic Finite Element Models: Modelling and Stimulation." Laboratory for Nonlinear Systems Control, Department of Mechanical Engineering, University of Toronto, 5 King's College Road, Toronto, Ontario, Canada M5S 1A4. Eee International Conference on Robotics and Automation 0-7803-1965-6/95 $4.00 © 1995 IEEE.

(56) References Cited

OTHER PUBLICATIONS

Extended European Search Report in EP19882138, mailed Aug. 9, 2022, 7 pages.
Third Office Action in CN201810970640.3, mailed Jul. 8, 2022, 10 pages.
English language translation of the third Office Action in CN201810970640.3, mailed Jul. 8, 2022.
International Search Report and the Written Opinion issued for corresponding International Application No. PCT/US21/40332, mailed Dec. 13, 2021, 12 pages.
Jorge Corona-Gastuera et al,; "An Approach for Intelligent Fixtureless Assembly: Issues and Experiments;" A. Gelbukh, A. de Albornoz, and H. Terashima (Eds.): MICAI 2005, LNAI 3789, pp. 1052-1061, 2005. © Springer-Verlag Berlin Heidelberg 2005.
Ogun, P. et al., 2015. "3D Vision Assisted Flexible Robotic Assembly of Machine Components." IN: Proceedings of 2015 8th International Conference on Machine Vision (ICMV 2015), Barcelona, spain, Nov. 19-21, 2015 (Proceedings of SPIE, 9878, DOI: 10.1117/12.2229053).
James K. Mills et al., "Robotic Fixtureless Assembly of Sheet Metal Parts Using Dynamic Finite Element Models: Modelling and Stimulation." Laboratory for Nonlinear Systems Control, Department of Mechanical Engineering, University of Toronto, 5 King's College Road, Toronto, Ontario, Canada M5S 1A4. IEEE International Conference on Robotics and Automation 0-7803-1965-6/95 $4.00 © 1995 IEEE.

\* cited by examiner

SYSTEMS AND METHODS FOR ADHESIVE-BASED PART RETENTION FEATURES IN ADDITIVELY MANUFACTURED STRUCTURES

BACKGROUND

Field

The present disclosure relates generally to apparatus and techniques in manufacturing, and more specifically to systems and methods for adhesive-based part retention features in additively manufactured structures for use in producing vehicles, boats, aircraft, and other mechanical structures.

Background

Three-dimensional (3-D) printing, which may also be referred to as additive manufacturing (AM), is a process used to create 3-D objects. The 3-D objects may be formed using layers of material based on digital model data of the object. A 3-D printer may form the structure defined by the digital model data by printing the structure one layer at a time. 3-D printed objects may be almost any shape or geometry.

A 3-D printer may disseminate a powder layer (e.g., powdered metal) on an operating surface. The 3-D printer may then consolidate particular areas of the powder layer into a layer of the object, e.g., by using a laser to melt or sinter the powder of the powder layer together. The steps may be repeated to sequentially form each layer. Accordingly, the 3-D printed object may be built layer by layer to form the 3-D object.

3-D printing is non-design specific, which offers geometric and design flexibility that conventional manufacturing processes cannot. Furthermore, 3-D printing technologies can produce parts with very small feature sizes, and geometries that are either significantly difficult or impossible to produce using conventional manufacturing processes.

Very large components which exceed printer size specifications can be segregated at the design phase, printed in parallel and combined. The versatility of 3D printing and its ability to create highly complex structures is driving its increased adoption by the industry.

However, as the sophistication of the features of the 3-D printed part increases, the production volume would decrease. The production volume also decreases with the increasing size of the 3-D printed component. These practical limitations are often inherent in certain 3-D printing processes, which may rely on slower printing speeds for accurate rendering of complex geometries.

Additive manufacturing (AM) has provided a significant evolutionary step in the development and manufacture of vehicles and other transport structures. For nearly a century prior to the introduction of AM, manufacturers have been relegated to the assembly line technique of vehicle production using conventional machining to construct and assemble vehicle parts. Because the machined parts are generally specific to a vehicle model design, and acquiring new tooling to construct modified parts can be cost prohibitive, manufacturers have had limited flexibility to implement modifications to an established vehicle design. As a result, a manufacturing facility often uses assembly lines that are limited to producing a single vehicle model.

Being non-design specific, AM is capable of enabling construction of an almost unlimited variety of structures having diverse geometrical shapes and material characteristics. Different AM printers can provide these structures using a variety of materials, including metals, alloys, and thermoplastics. In a new infrastructure hereinbefore proposed by Applicant, AM becomes a primary means of developing custom parts. Parts made via traditional machining and casting, together with widely available commercial off-the-shelf (COTS) parts, can be linked together in a modular form via these custom AM structures to form a chassis of a vehicle, the fuselage of an aircraft, body of a sea vessel, and the like. AM modular parts can also be printed that form the interior of the transport structure. Design modifications are straightforward and can be affected by printing modified AM structures, which avoids the expense of acquiring new tooling.

AM may include the manufacture of one or more nodes. A node is a structural member that may include one or more interfaces used to connect to other nodes or spanning components such as tubes, extrusions, panels, and the like. Using AM, a node may be constructed to include additional features and functions, including interface functions, depending on the objectives.

As described above, nodes and other components may be connected together. For example, one or more nodes and/or other components may be connected together to form larger components. Accordingly, individual AM structures often need to be connected together, or individual AM structures often need to be connected to machined or COTS parts, to provide combined structures, e.g., to realize the above modular network or to form a complex interior assembly in a vehicle. Examples include node-to-node connections, node-to-panel connections, node-to-tube connections, and node-extrusion connections, among others. To connect an AM joint member with a vehicle body panel, for example, mechanical connectors (e.g., screws, clamps, etc.) may be used. Alternatively or additionally, an adhesive may be used to form a strong bond. For connecting these parts, a strict tolerance is often required, meaning that the parts must be positioned to fit precisely in an established orientation. For example, the two parts to be adhered may need to be positioned to avoid direct contact with each other in order to mitigate possible galvanic corrosion problems. In general, an adhesive connection between the AM joint member and panel should result in an accurate fit. Thus the AM joint member should not be misaligned with or offset from the body panel, for example, and the parts should remain properly oriented when a permanent bond is established.

When an adhesive is initially applied between two parts, the force of the adhesive creates a positive pressure that tends to separate the two parts. This separation can adversely affect the integrity of the resulting connection, e.g., where the separation causes the parts to shift during manufacturing. Even when an adhesive is correctly applied in a manner that does not cause the parts to separate or misalign, the adhesive often expands or shifts as it is cured. The resulting position of the adhered parts may in that case not comply with the connection as originally intended.

3-D printed components may be used to produce sub-components for various devices or apparatus. The 3-D printed sub-components may need to be attached or connected to other sub-components, including other 3-D printed sub-components, extruded sub-components, COTS parts, or still other sub-components.

SUMMARY

Several aspects of apparatus for systems and methods for adhesive-based part retention features in additively manufactured structures will be described more fully hereinafter with reference to three-dimensional printing techniques.

One aspect is an apparatus including an additively manufactured node. The apparatus also includes adhesive-based part retention features. Systems and methods for adhesive-based part retention features in additively manufactured structures are disclosed. A structure includes a first AM part configured to connect to a second part via a primary connection applied to an interface between the first AM part and the second part. The structure includes at least one retention element including a secondary connection. The secondary connection includes a first adhesive configured to secure the first AM part and the second part. The secondary connection may be located to provide a connection between the first AM part and the second part.

It will be understood that other aspects of apparatus for adhesive-based part retention features in additively manufactured structures will become readily apparent to those skilled in the art from the following detailed description, wherein it is shown and described only several embodiments by way of illustration. As will be realized by those skilled in the art, the apparatus for bridging is capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of apparatus for bridging will now be presented in the detailed description by way of example, and not by way of limitation, in the accompanying drawings, wherein.

DETAILED DESCRIPTION

Figure 1A:
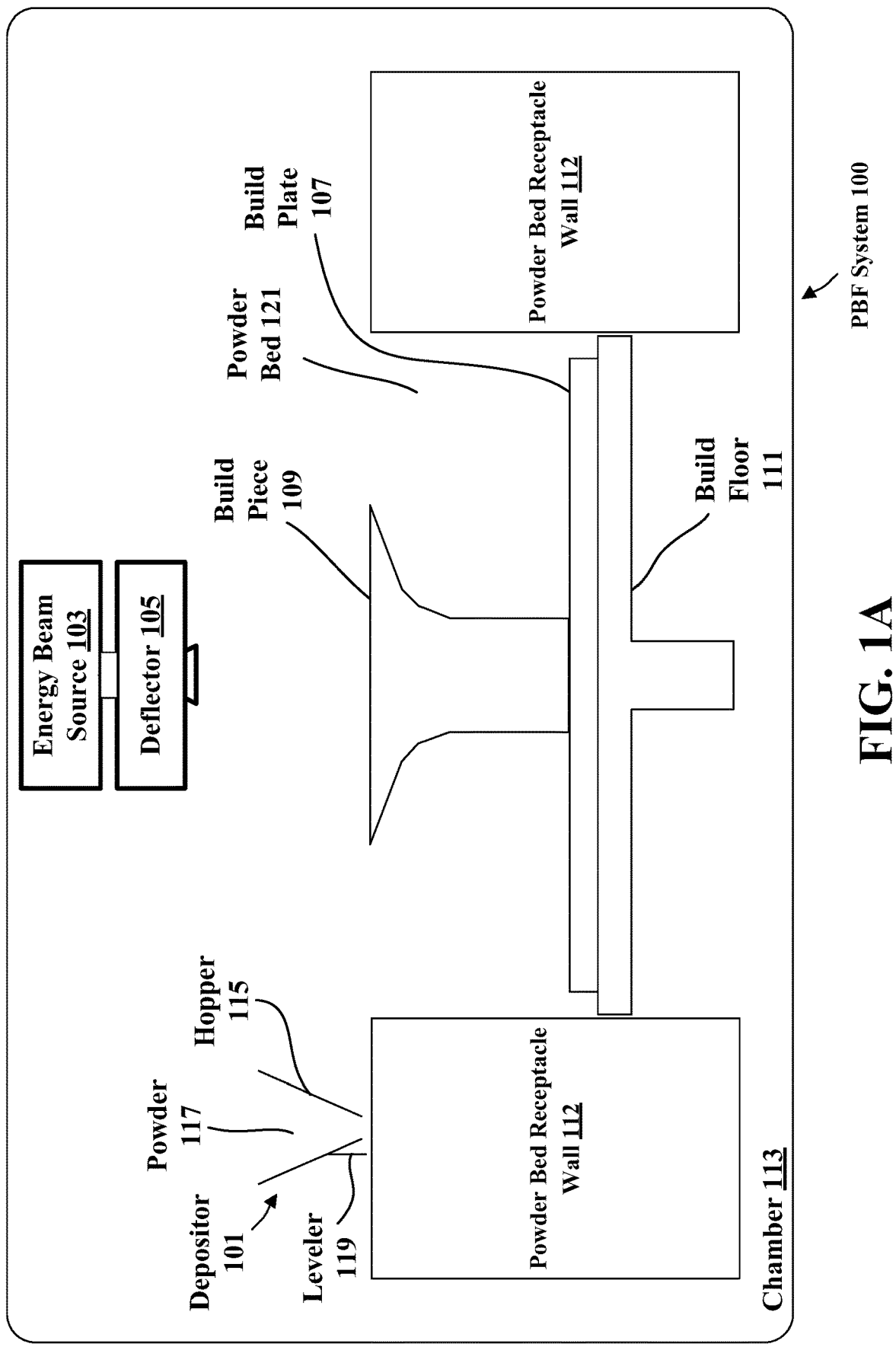
FIGS. 1A-D illustrate respective side views of an exemplary 3-D printer system.

The detailed description set forth below in connection with the drawings is intended to provide a description of exemplary embodiments of the present invention. The description is not intended to represent the only embodiments in which the invention may be practiced. The terms "exemplary" and "example" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form or may be shown not drawn to scale, or omitted entirely, in order to avoid obscuring the various concepts presented throughout this disclosure.

The present disclosure is directed to adhesive based part retention features used to hold various structures in place during at least one of application and curing of a primary adhesive for bonding the structures together. The part retention features may, in some examples, be permanent and may form an additional bond in conjunction with the primary adhesive. In other examples, the adhesive based part retention feature may be temporary and may be removed after the primary adhesive bond between the structures is formed. The structures to be bonded together may include, for example, two (or more) additively manufactured (AM) parts, an AM part and a tube, panel, extrusion, or any other type of conventionally-manufactured part, or a COTS part. The disclosure covers the use of an adhesive to bond the parts, including conventional adhesives and also including sealants or other materials that may have adhesive properties.

Conventional attempts to address the problems described herein include the use of standoff tabs. Standoff tabs, however, typically have large and cumbersome profiles that render processing steps more difficult, and are more often than not impracticable for the types of precision manufacturing steps involved in automated adhesive injection.

In various examples, one of the parts involved in the adhesion process is a node. A node is an AM structure that includes a feature, e.g., a surface feature that facilitates sealing, adhering, etc., a socket, a receptacle, etc., for attaching to another structure, e.g., a tube, a panel, etc. In addition to their ability to interconnect different types of structures, nodes can be fabricated to perform a variety of different functions. For example, nodes can be used to route electrical circuitry in vehicles or to enable fluid flow. Nodes can be formed by fusing a powder material. For example, a 3-D printer can melt and/or sinter at least a portion of the powder material in multiple layers to form the node. Nodes may be formed of one or more metal and/or non-metal materials. The node may be formed of a substantially rigid material. The materials in a node may include a metallic material (e.g. aluminum, titanium, stainless steel, brass, copper, Chromoly steel, iron, etc.), a composite material (e.g. carbon fiber, etc.), a polymeric material (e.g. plastic, etc.), a combination of these materials and/or other materials, etc.

Nodes can be particularly useful in joint designs for connecting various parts of complex structures, for example. In some designs, nodes can allow for higher levels of dimensional tolerance acceptance that may be needed when assembling complex structures. Node-based designs can also allow for reduced weight, reduced post-processing, and increased ease of assembly. In addition, nodes can be used as sockets to adjust for tolerance in designs, and nodes can be co-printed with other parts, which takes advantage of a unique benefit of 3-D printing to simplify the assembly process.

Nodes can be connected to other nodes, panels, tubes, extrusions, and other parts. The connection may involve a mechanical connection, an adhesive connection, or some combination of the two. In embodiments where a size of the node exceeds the printer size (e.g., the size of the powder bed), the node may be 3-D printed as a plurality of sub-nodes, which may then be combined through adhesion.

Two parts may be adhered together in various ways. Adhesion may be performed manually, semi-automatedly, or automatedly. In the exemplary case of an AM node used in a node-to-panel connection, adhesive, sealant, and/or vacuum ports may be 3-D printed into the AM node to enable an automated constructor to inject adhesive at a preconfigured port. The automated constructor, such as a robot, may use an effector specifically designed to inject adhesive into an injection port. In some cases, only adhesive is injected. In other cases, sealant may be injected to circumscribe the areas to where the adhesive can flow. A vacuum may also be applied in some cases to facilitate the flow of the adhesive into an adhesive region located at an interface between a surface of the AM node and a surface of the panel.

Whether the application of adhesive is performed manually or, by contrast, using automated means, the action of applying the adhesive generally results in a positive pressure being applied to the corresponding structures being adhered, which may result in the separation of the two structures being adhered. This separation, left unaddressed, may result in a combination of structures that is misaligned or otherwise improperly connected, or a wholesale failure of the connection where the parts simply separate far enough to avoid the effect of the adhesive.

Further, with or without the problem of positive pressure upon the application of the adhesive, many or most adhesives expand when curing, especially when being thermally cured. This expansion may similarly result in an improper alignment or other faulty connection of the parts being adhered. For example, the parts may have been designed to be in close proximity and/or actual contact at certain points. The expansion due to curing may cause the parts to separate.

In an aspect of the disclosure, one or more part retention features. The part retention features may be mechanical structures operable for use in securing the two or more parts being connected such as through adhesion. The part retention features may cause the parts being connected to temporarily remain in position during either or both of application or curing of the primary adhesive used to bond the parts. The part retention features may be temporary in nature and may be removed after the adhesion process is complete. Alternatively, the part retention features may be permanent. In the latter case, the features may add no appreciable mass or other adverse effect to the adhered structure, and therefore it may not be necessary to add a removal step to the manufacturing process. The features in some cases may have alternative uses beyond those of part retention.

A number of the part retention features disclosed herein advantageously have flatter profiles than conventional standoff tabs used for similar purposes. Because the features do not stick out and potentially interfere with other adjacent structures, a manufacturing step of removing the features may be avoided. In other cases, a flatter profile means that the structures with smaller part retention features can be more compactly placed in any given area to conduct the adhesion process. In turn, less room is necessary for the part retention features, which features may be ancillary or temporary in nature.

The use of 3-D printing may provide significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that may not be possible to manufacture via traditional manufacturing processes or may be cost prohibitive to manufacture via traditional manufacturing processes. As discussed above, the 3-D printed sub-components may need to be attached or connected to other sub-components, including other 3-D printed sub-components, extruded sub-components, or still other sub-components.

FIGS. 1A-D illustrate respective side views of an exemplary 3-D printer system that may be used to make the AM parts described herein. These AM parts may form sub-components that may need to be attached or connected to other sub-components, including other AM/3-D printed sub-components, extruded sub-components, COTS parts, or still other sub-components. In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls 112 of the powder bed receptacle generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
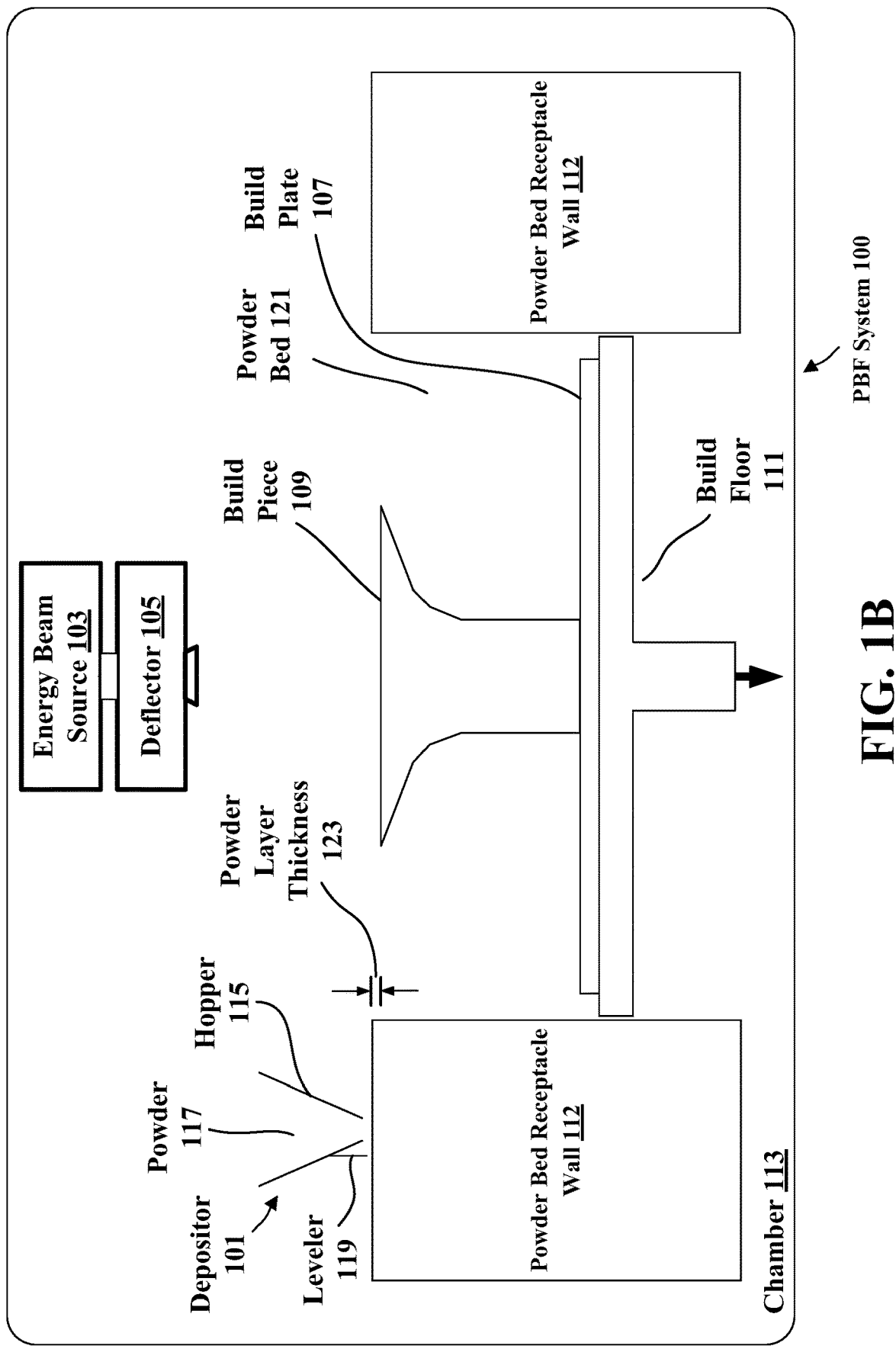

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
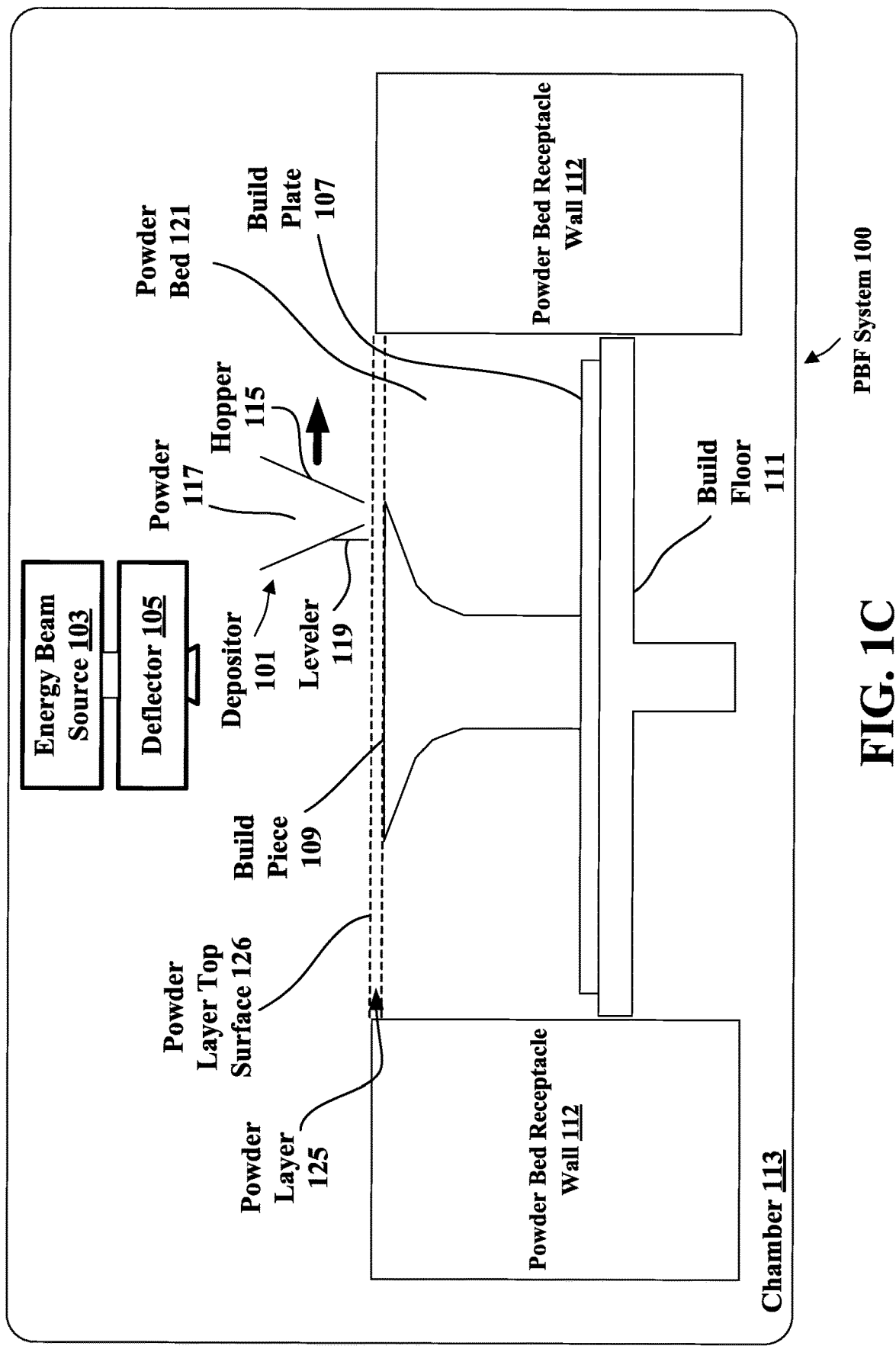

FIG. 1C shows PBF system 100 at a stage in which depositor 101 is positioned to deposit the powder 117 in a space created over the top surfaces of build piece 109 and powder bed 121 and bounded by powder bed receptacle walls 112. In this example, depositor 101 progressively moves over the defined space while releasing the powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B) is greater than an actual thickness used for the example involving 150 previously-deposited layers discussed above with reference to FIG. 1A.

Figure 1D:
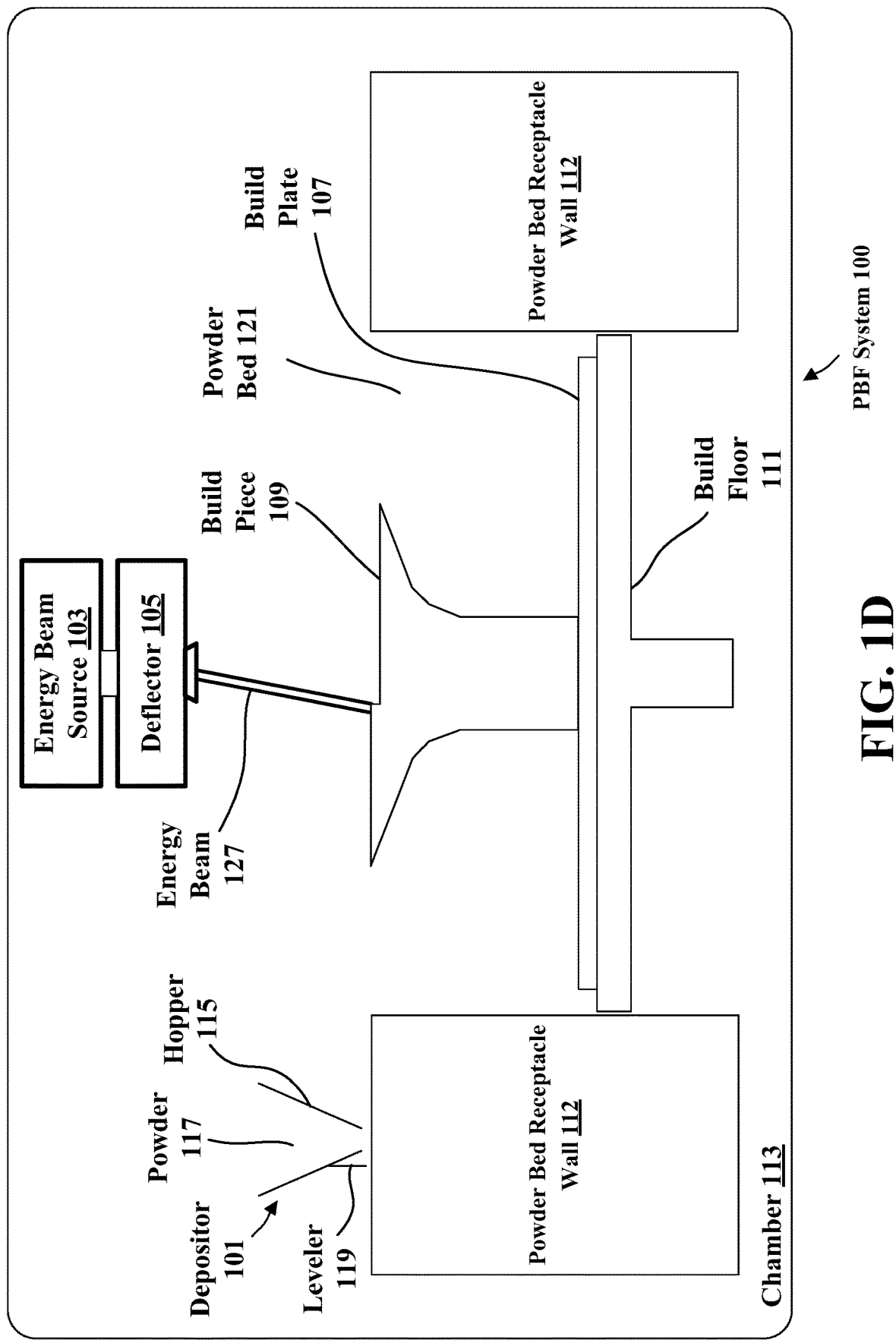

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case, energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case, the energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 2:
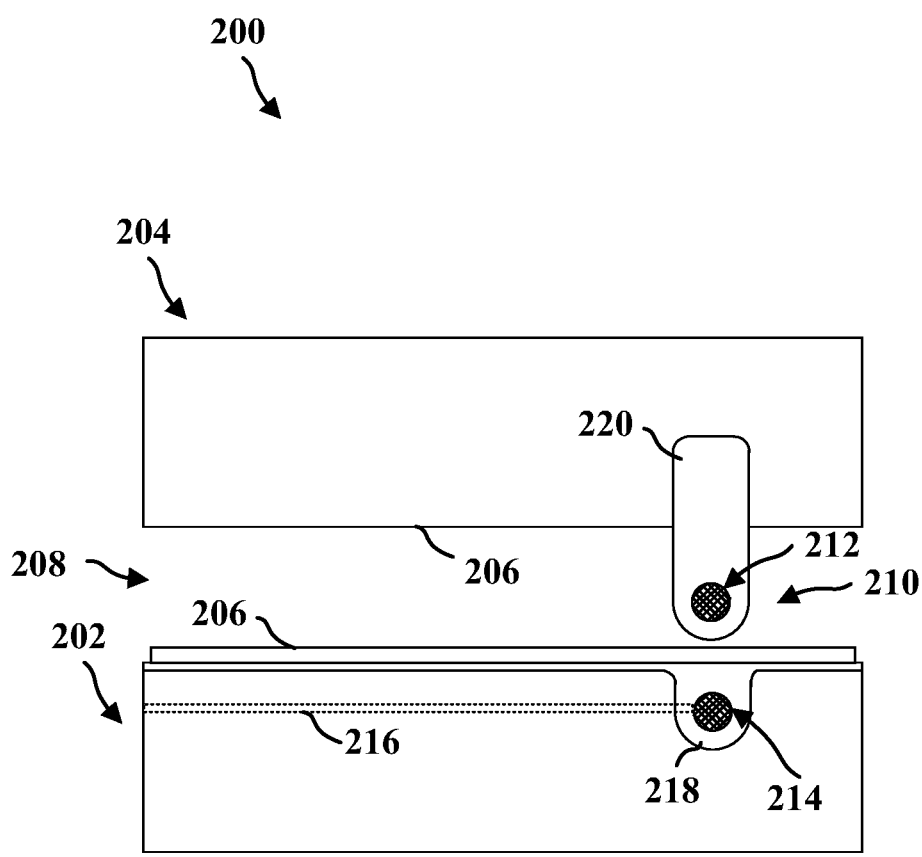
FIG. 2 is a diagram illustrating an example structure.

FIG. 2 is a diagram illustrating an example structure 200. The example structure 200 illustrated in FIG. 2 includes a first additively manufactured (AM) part 202 configured to connect to a second part 204 via a primary connection 206 applied to an interface 208 between the first AM part 202 and the second part 204.

Figure 3:
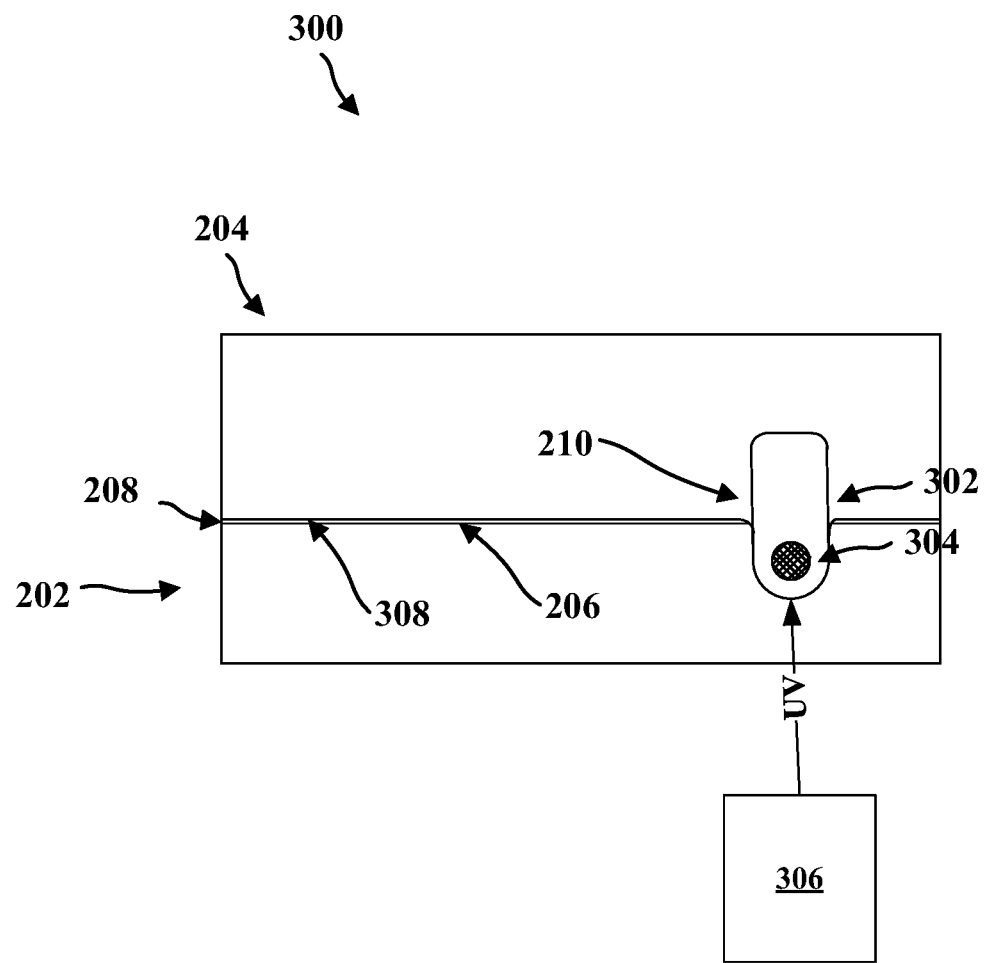
FIG. 3 is a diagram illustrating the example structure in an assembled state.

In an aspect, at least one retention element 210 including a secondary connection 302 (see FIG. 3). The secondary connection 302 including a first adhesive 304 (see FIG. 3) configured to secure the first AM part 202 and the second part 204. The secondary connection located to provide a connection between the first AM part 202 and the second part 204.

FIG. 3 is a diagram illustrating the example structure 300 in an assembled state. The example structure 300 illustrated in FIG. 3 includes the first AM part 202 connected to the second part 204 via the primary connection 206 applied to the interface 208 between the first AM part 202 and the second part 204.

In an aspect, the at least one retention element 210 including a secondary connection 302. The secondary connection 302 including a first adhesive 304 configured to secure the first AM part 202 and the second part 204. The secondary connection may be located to provide a connection between the first AM part 202 and the second part 204.

The example structure 200 may include a first additively manufactured (AM) part 202 and at least one retention element 204. The first AM part 202 may be a node, a subcomponent of a node, or other type of component. The AM part 202 may be printed through any conventional means including, for example, via PBF, e.g., as described with respect to FIGS. 1A-D. The PBF printing may be performed using any technology suitable for use in PBF printing. These technologies may include, for example, selective laser melting (SLM), selective laser sintering (SLS), selective heat sintering (SHS), electron beam melting (EBM), direct metal laser sintering (DMLS), and others. In other embodiments, the AM part 202 may be printing using a different 3-D print technology such as fused deposition modeling (FDM). FDM AM may be ideal for printing various plastics, thermoplastics, etc. In general, the AM part 202 may be additively manufactured using any known AM technique or techniques.

One advantage of the use of AM in combining parts is that, due to the design flexibility of AM, the AM part 202 may include various features 212, 214, 216 that may, in turn, be used in conjunction with the adhesive-based part retention. For example, AM may be used to generate features 212, 214 that are adhered together, features 216 that carry adhesive to a location or locations (e.g., primary connection 206 and/or retention element 210, feature 214) where the AM part 202 may be adhered to another part 204, or a combination of both of these (e.g., features 212, 214, 216). Furthermore, adhesive-based part retention may be combined with mechanical-based part retention. For example, primary adhesive-based part retention may be combined with mechanical-based part retention. Secondary adhesive-based part retention (e.g., holding parts together while a primary adhesive is applied, dries, and/or cures) may be combined with mechanical-based part retention. Some combination of primary adhesive-based part retention and secondary adhesive-based part retention may be combined with mechanical-based part retention. Mechanical-based part retention may include, for example, groove that retains a snap-ring, screw and shim, spring-loaded clips, clips, a snap-like part retention element, snap-like part retention feature slidably engaging with a receptacle on an another part, a Christmas tree fastener, magnets, a tongue and groove connection, or other mechanical-based connections.

In an example, the first AM part 202 may be configured to connect to a second part 204. The second part 204 may include, for example, an AM part, a tube, a panel, an extrusion, any other type of conventionally-manufactured part, or a COTS part. Thus, structures formed may be manufactured by bonding together, for example, two (or more) AM parts (e.g., where one AM part may be considered the first AM part), or an AM part (e.g., where the AM part may be considered the first AM part) and a tube, panel, extrusion, or any other type of conventionally-manufactured part, or a COTS part.

The connection between the first AM part 202 and the second part may be via a primary connection. For example, the primary connection may include a primary adhesive for bonding the structures together. The primary connection may be applied to an interface between the first AM part 202 and the second part 204. For example, the primary adhesive may be applied A part retention feature (e.g., part retention element 210) may, in some embodiments, be temporary and may be removed after the primary adhesive bond between the structures is formed. Adhesive(s) may also be used for the part retention features. For example, at least one retention element may be included. The at least one retention element may include a secondary connection 302. The secondary connection 302 may include an adhesive configured to secure the first AM part 202 and the second part 204. Furthermore, the secondary connection 302 may be located to provide a connection between the first AM part 202 and the second part 204.

In an aspect, the first adhesive includes a hot melt material applied between a first mechanical feature 214 associated with the first AM part 202 and a second mechanical feature 212 associated with the second part 204. The hot melt material may include any form of hot melt adhesive, hot melt glue, or another thermoplastic adhesive. Generally, however, the hot melt adhesive, hot melt glue, or another thermoplastic adhesive may be quick curing such that hot melt adhesive, hot melt glue, or another thermoplastic adhesive. Accordingly, the hot melt material may be a quick curing adhesive or a quick curing sealant.

In an aspect, hot melt material may be used. The hot melt material may be a quick curing adhesive or sealant that may be applied to the mechanical features on two components to be connected. The features may have an increased surface area. The increased surface area may enable sufficient bond strength to retain the two (or more) parts being connected. Once the hot melt retention fluid cures, adhesive may be injected between the nodes being connected. The cured hot melt feature would ensure that the two parts 202, 204 are retained during the adhesive injection process. The retention force (i.e., the force provided by the hot melt holding the two nodes together) would be higher than the adhesive injection force, thereby securely holding the parts 202, 204 in the proper orientation and with the required separation distance to ensure repeatable bonds.

In an aspect, the first adhesive includes an ultraviolet (UV) cured adhesive applied between a first mechanical feature associated with the first AM part 202 and a second mechanical feature associated with the second part. UV cure systems 306 may be utilized as part retention features. In this embodiment, adhesives at the retention features would be UV cured such that they are held in place during the adhesive injection and curing process. The UV cure adhesives would be applied at strategic locations to provide sufficient retention force. The UV cure adhesive would be configured to cure prior to the adhesive injection and curing.

In an aspect, the primary connection 206 between the first AM part 202 and the second part 204 includes a second adhesive 308. For example, a secondary adhesive may be between the first AM part 202 and the second part 204 where the first AM part 202 and the second part 204 meet, e.g., as illustrated in FIG. 3.

In an aspect, the first adhesive 304 is faster curing than the second adhesive 308. For example, as discussed above, hot melt material such as, hot melt adhesive, hot melt glue, or another thermoplastic adhesive that may be quick curing may be used as the first adhesive 304. The second adhesive 308 may cure more slowly.

In an aspect, the secondary connection 302 further includes a mechanical structure (e.g., making up retention element 210). For example, the secondary connection may include both an adhesive and mechanical-based part retention. Mechanical-based part retention may include, for example, groove that retains a snap-ring, screw and shim, spring-loaded clips, clips, a snap-like part retention element, snap-like part retention feature slidably engaging with a receptacle on another part, a Christmas tree fastener, magnets, a tongue and groove connection, or other mechanical-based connections that may be used in addition to the adhesive.

In an aspect, the mechanical structure may be integrated with at least one of the first AM part 202 and the second part 204. For example, mechanical structure 218 may be integrated with the first AM part 202. Mechanical structure 220 may be integrated with the second part 204.

In an aspect, the mechanical structure is co-printed with at least one of the first AM part 202 and the second part 204. For example, mechanical structure 218 may be co-printed with the first AM part 202. Mechanical structure 220 may be co-printed with the second part 204.

In an aspect, the mechanical structure is separate from the first AM part 202 and the second part 204. For example, mechanical structure 218 may be attached to the first AM part 202 after the first AM part 202 is manufactured. Mechanical structure 220 may be attached to the second part 204 after the second part 204 is manufactured.

Figure 4:
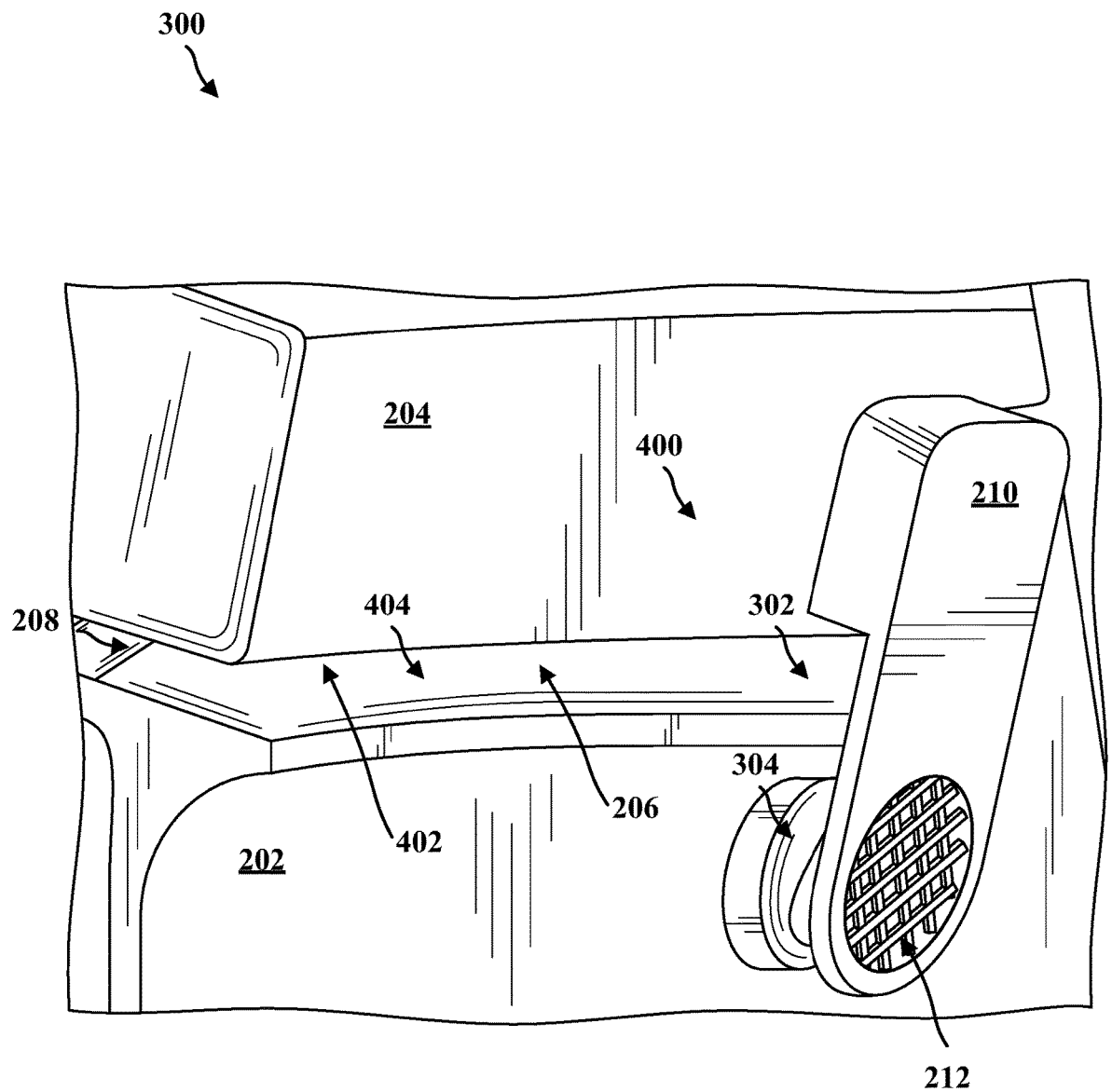
FIG. 4 is a diagram illustrating a portion of the example structure of FIG. 3.

FIG. 4 is a diagram illustrating a portion 400 of the example structure 300 of FIG. 3. The example structure 300 includes the first AM part 202 connected to the second part 204 via the primary connection 206 applied to the interface 208 between the first AM part 202 and the second part 204.

In an aspect, the at least one retention element 210 including a secondary connection 302. The secondary connection 302 including a first adhesive 304 configured to secure the first AM part 202 and the second part 204. The secondary connection may be located to provide a connection between the first AM part 202 and the second part 204.

As illustrated in FIG. 4, the second part 204 may be a node with a groove 402. The first AM part 202 may be a node with a tongue 404. The tongue 404 of the first AM part 202 may insert into the groove 402 of the second part 204, e.g., when the first AM part 202 is assembled with the second part 204 to form a structure. The adhesive 304 may be a hot melt adhesive that may be applied near a hot melt retention feature, e.g., mechanical feature 212, that mates with another retention feature, e.g., mechanical feature 210.

Figure 5:
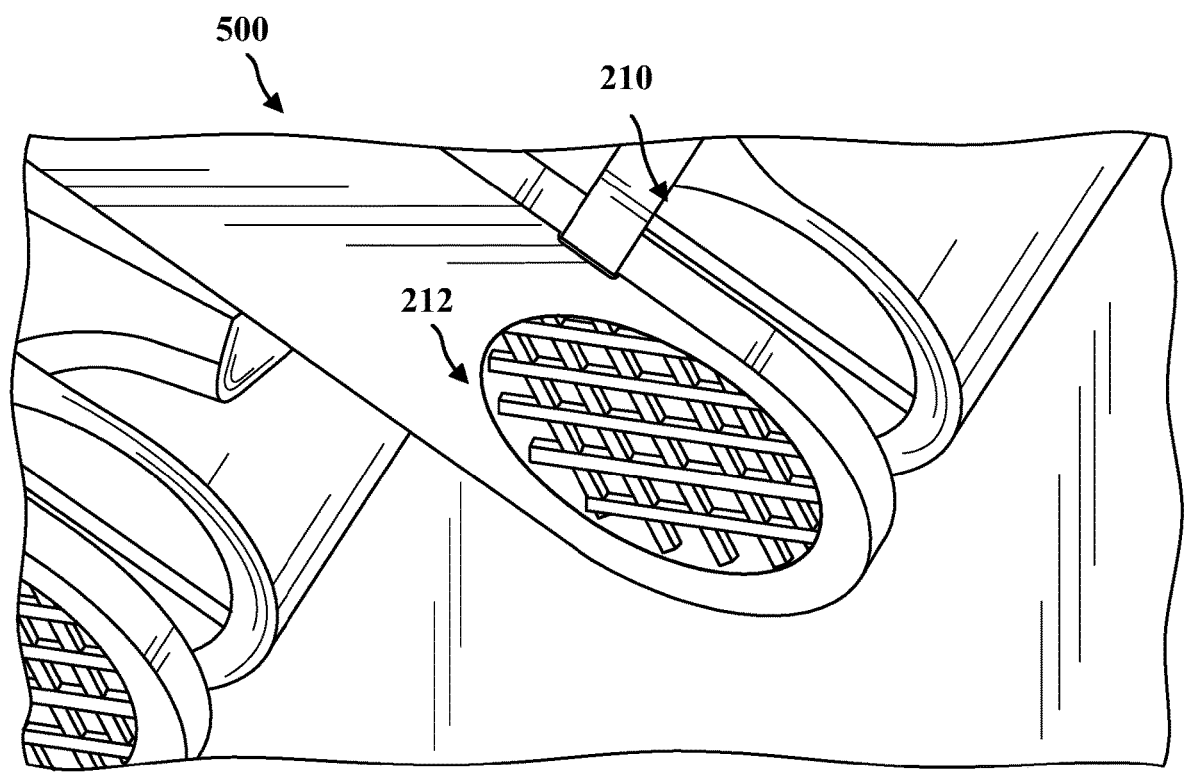
FIG. 5 is a diagram illustrating a portion of the example structure of FIG. 3.

FIG. 5 is a diagram illustrating a portion 500 of the example structure 300 of FIG. 3. More specifically, FIG. 5 illustrates an example of the hot melt retention feature, e.g., mechanical feature 212, that mates with another retention feature, e.g., mechanical feature 210. As illustrated in FIG. 5, the hot melt retention feature, e.g., mechanical feature 212 may be a single bar retention feature. Accordingly, mechanical feature 212 may be a single bar or shaft across an open circular area that forms a retention feature. Additionally, as illustrated in FIG. 5, a hot melt retention feature, e.g., mechanical feature 210 may be a tennis racket or waffle maker retention feature. Accordingly, mechanical feature 210 may be multiple bars or shafts across an open circular area that forms a retention feature generally similar in shape to a tennis racket or hot plate on a waffle maker. Glue or adhesive may be placed between the mechanical feature 210 and the mechanical feature 212. The glue or adhesive may flow in between portions of the mechanical feature 210 and the mechanical feature 212 and may bind to the portions of the mechanical feature 210 and the mechanical feature 212. For example, the glue or adhesive may bind to the single bar retention feature and/or the tennis racket or waffle maker retention features.

Figure 6:
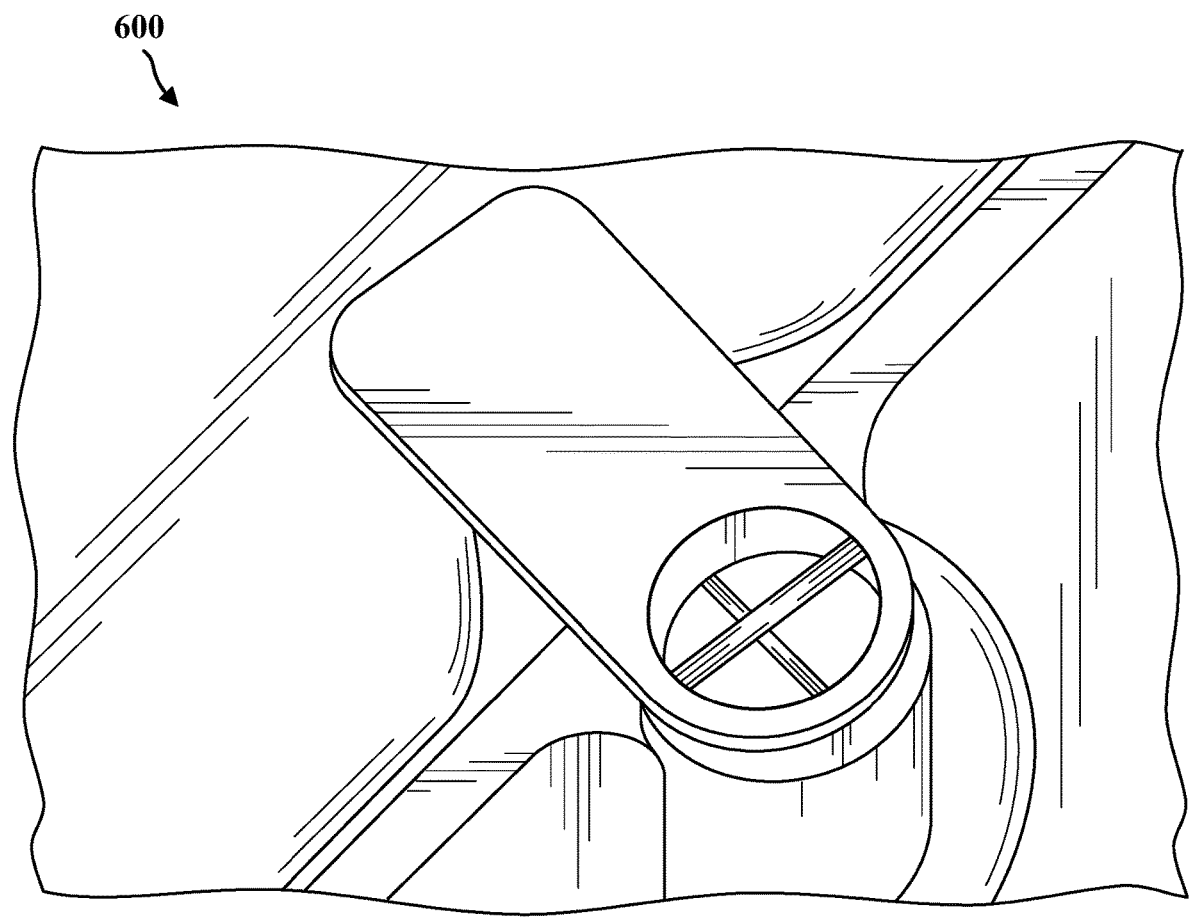
FIG. 6 is a diagram illustrating a portion of the example structure of FIG. 3.

FIG. 6 is a diagram illustrating a portion 600 of the example structure 300 of FIG. 3. More specifically, FIG. 6 illustrates two examples of the hot melt retention feature, e.g., mechanical features 210, 212 that mate together. The mechanical features 210, 212 are both single bars or shafts. The single bars or shafts are each formed across a respective circular opening, each circular opening (and the corresponding bar or shaft) forms a respective retention feature. Glue or adhesive may be placed between the mechanical feature 210 and the mechanical feature 212. The glue or adhesive may flow in between portions of the mechanical feature 210 and the mechanical feature 212 and may bind to the portions of the mechanical feature 210 and the mechanical feature 212. For example, the glue or adhesive may bind to the single bar retention features.

In an aspect, a means for additively manufacturing a first AM part 202 may include a 3-D printer system (e.g., PBF system 100 of FIGS. 1A-1D) or another additively manufacturing system. The means for additively manufacturing a first AM part may manufacture the first AM part 202 configured to connect to a second part 204 via a primary connection 206 applied to an interface 208 between the first AM part 202 and the second part 204.

In an aspect, a means for attaching the second part 204 to the first AM part 202 may include a mechanical device or devices (such as one or more manufacturing robot) for attaching the second part 204 to the first AM part 202. For example, the manufacturing robot(s) may locate the second part 204 proximal to the first AM part 202.

In an aspect, one or more manufacturing robot(s) may apply one or more adhesives to one or more retention elements. Accordingly, in an aspect, a means for applying the first adhesive may include one or more manufacturing robot(s). For example, a dedicated robot (or robots) may be used to apply adhesive(s). In another example, the one or more manufacturing robot used for attaching the second part 204 to the first AM part 202 may also be configured to apply adhesive(s). Accordingly, the means for applying the first adhesive may include aspects of the for attaching the second part 204 to the first AM part 202 that apply the adhesive(s).

Manufacturing robot(s) may attach the second part 204 to the first AM part 202 using at least one retention element 210 including a secondary connection 302. The secondary connection 302 may include a first adhesive configured to secure the first AM part 202 and the second part 204. The secondary connection 302 may be located to provide a connection between the first AM part 202 and the second part 204.

A means for applying the first adhesive may be configured to apply the first adhesive during one of application of the second adhesive, during curing of the second adhesive, prior to application of the second adhesive, and/or prior to curing of the second adhesive. In an aspect, the adhesive(s) may be applied to secure the first AM part and the second part during application of the second adhesive. In an aspect, the adhesive(s) may be applied to secure the first AM part and the second part during curing of the second adhesive.

Figure 7:
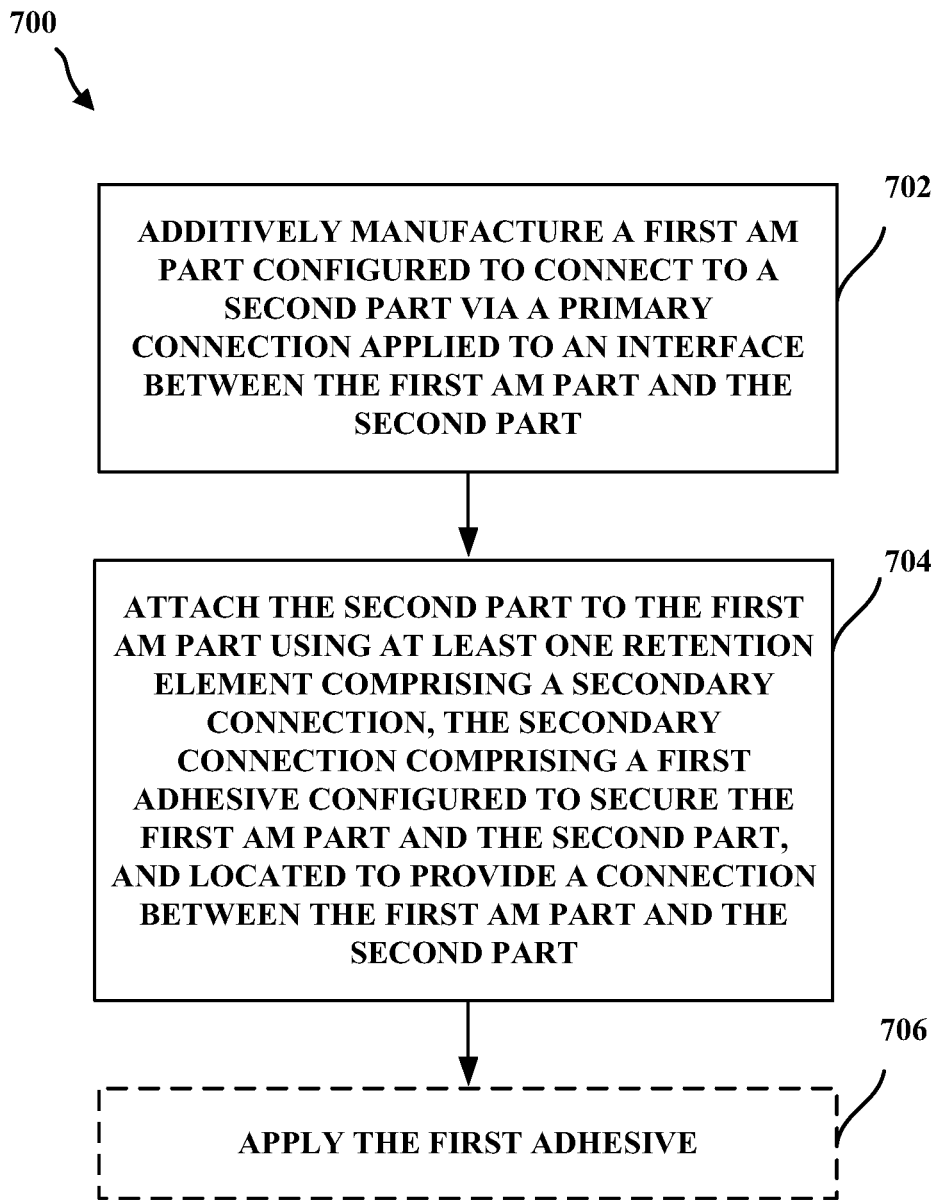
FIG. 7 is a flow diagram of an exemplary process for adhering an AM structure with another structure.

FIG. 7 is a flow diagram 700 of an exemplary process for adhering an AM structure with another structure. The exemplary process for adhering an AM structure with another structure may be implemented, at least in part, using an exemplary 3-D printer system. Some aspects may be implemented using other tools, systems, or devices, as is discussed herein. For example, one a 3-D printer system may be the PBF system 100 discussed in FIGS. 1A-1D.

In an aspect, block 702 includes additively manufacturing a first AM part. For example, a 3-D printer system or another additively manufacturing system additively manufacturing a first AM part configured to connect to a second part. The first AM part may be connected to the second part via a primary connection applied to an interface between the first AM part and the second part. For example, block 702 includes a 3-D printer system (e.g., PBF system 100) or another additively manufacturing system additively manufacturing a first AM part 202 configured to connect to a second part 204. The first AM part 202 may be connected to the second part 204 via a primary connection 206 applied to an interface 208 between the first AM part 202 and the second part 204. In some aspects, the second part may include, for example, an AM part, a tube, a panel, an extrusion, any other type of conventionally-manufactured part, or a COTS part. Accordingly, in some aspects, a 3-D printer system or another additively manufacturing system may manufacture the second part. (The manufacture of the second part is not necessarily part of the implemented method.)

In an aspect, block 704 includes attaching the second part to the first AM. For example, a mechanical device (such as a manufacturing robot) and/or an individual (or individuals) may attach the second part to the first AM part using at least one retention element including a secondary connection. The secondary connection may include a first adhesive configured to secure the first AM part and the second part. Additionally, the adhesive may be located to provide a connection between the first AM part and the second part. For example, the second part 204 may be attached to the first AM part 202 using at least one retention element 210 including a secondary connection 302. The secondary connection 302 may include a first adhesive configured to secure the first AM part 202 and the second part 204. Additionally, the adhesive may be located to provide a connection between the first AM part 202 and the second part 204.

As indicated in block 702, the secondary connection 302 may include a first adhesive. Accordingly, in block 704 the first adhesive may be applied. For example, a mechanical device (such as a manufacturing robot) and/or an individual (or individuals) may apply the first adhesive. In an aspect, the first adhesive is faster curing than the second adhesive. An aspect may include applying the first adhesive during application of the second adhesive. Another aspect may include applying the first adhesive during curing of the second adhesive. Another aspect may include applying the first adhesive prior to application of the second adhesive. Another aspect may include applying the first adhesive prior to curing of the second adhesive. Another aspect may include applying the first adhesive to secure the first AM part and the second part during application of the second adhesive. Another aspect may include applying the first adhesive to secure the first AM part and the second part during curing of the second adhesive.

The first adhesive may include a hot melt material applied between a first mechanical feature (e.g., mechanical structure 218) associated with the first AM part 202 and a second mechanical feature (e.g., mechanical structure 220) associated with the second part 204.

In an aspect, the first adhesive comprises a UV cured adhesive applied between a first mechanical feature (e.g., mechanical structure 218) associated with the first AM part 202 and a second mechanical feature (e.g., mechanical structure 220) associated with the second part 204.

In an aspect, the primary connection between the first AM part 202 and the second part 204 may include a second adhesive.

In an aspect, the secondary connection may further include a mechanical structure such as mechanical structure 218, 220, or mechanical-based part retention such as a groove that retains a snap-ring, a screw and shim, spring-loaded clips, clips, a snap-like part retention element, a snap-like part retention feature slidably engaging with a receptacle on an another part, a Christmas tree fastener, magnets, a tongue and groove connection, or other mechanical-based connections.

In an aspect, the mechanical structure (e.g., mechanical structure 218, 220) is integrated with at least one of the first AM part 202 and the second part 204.

In an aspect, the mechanical structure (e.g., mechanical structure 218, 220) is co-printed with at least one of the first AM part 202 and the second part 204.

In an aspect, the mechanical structure (e.g., mechanical structure 218, 220) is separate from the first AM part 202 and the second part 204. For example, the mechanical structure (e.g., mechanical structure 218, 220) may be separately manufactured from the first AM part 202 and/or the second part 204. One of the mechanical structures (e.g., mechanical structure 218, 220) may then be attached to the first AM part 202 or the second part 204. Accordingly, as used with respect to mechanical structure 218, 220, "separate" may mean manufactured separately rather than not being attached together.

The previous description is provided to enable any person skilled in the art to practice the various aspects described herein. Various modifications to these exemplary embodiments presented throughout this disclosure will be readily apparent to those skilled in the art, and the concepts disclosed herein may be applied to apparatus for adhesive-based part retention features in additively manufactured structures. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An additively manufactured (AM) part, comprising:
a first portion configured to fix to a second part via a first connection, wherein the first connection comprises a second adhesive; and
a feature co-printed with the first portion and configured to provide a second connection between the first portion and the second part, the second connection being separated from the first connection by a wall, and comprising a first adhesive configured to secure the first portion to the second part, wherein the first adhesive is faster curing than the second adhesive and a portion of the feature includes a first mechanical feature configured to extend in a first direction beyond and overlap with a second portion of the second part such that a first side not facing in the first direction contacts the first adhesive to provide the second connection to fix the AM part to the second part with the first adhesive prior to the first portion being fixed to the second part via the first connection.

2. The AM part of claim 1, wherein the first adhesive comprises a hot melt material applied between the first mechanical feature and a second mechanical feature of the second part.

3. The AM part of claim 1, wherein the first adhesive comprises an ultraviolet (UV) cured adhesive applied between the first mechanical feature and a second mechanical feature of the second part.

4. The AM part of claim 1, wherein the first mechanical feature is further configured to mate with a second mechanical feature of the second part.

5. The AM part of claim 1, wherein the first connection includes a tongue and groove connection, and the first mechanical feature is configured to extend beyond a portion of the tongue and groove connection.

6. The AM part of claim 1, wherein the first mechanical feature is configured to extend beside an outside of the second part.

7. The AM part of claim 1, wherein the first mechanical feature comprises a bar.

8. The AM part of claim 1, wherein the first mechanical feature comprises a plurality of bars.

9. The AM part of claim 8, wherein the first mechanical feature is configured such that the first adhesive flows between at least two bars of the plurality of bars.

10. The AM part of claim 7, wherein the first mechanical feature further comprises an opening, wherein the bar is arranged within the opening.

* * * * *